(12) United States Patent
Becker et al.

(10) Patent No.: US 8,839,344 B2
(45) Date of Patent: Sep. 16, 2014

(54) ACCESS POLICY ANALYSIS

(75) Inventors: Moritz Y. Becker, Cambridge (GB);
Blair B. Dillaway, Clyde Hill, WA (US);
Gregory D. Fee, Seattle, WA (US);
Jason F. Mackay, Redmond, WA (US);
Jason Hogg, Kirkland, WA (US); John M. Leen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1146 days.

(21) Appl. No.: 12/021,299

(22) Filed: Jan. 28, 2008

(65) Prior Publication Data
US 2009/0193493 A1    Jul. 30, 2009

(51) Int. Cl.
*G06F 17/00* (2006.01)
*H04L 29/06* (2006.01)
*G06F 7/04* (2006.01)
*G06F 17/30* (2006.01)

(52) U.S. Cl.
USPC ............ 726/1; 726/2; 726/3; 726/4; 707/781; 707/783

(58) Field of Classification Search
USPC ............... 713/151, 201; 726/1–7; 707/9, 781, 707/783–785
See application file for complete search history.

(56) References Cited

U.S. PATENT DOCUMENTS

| | | | |
|---|---|---|---|
| 5,649,099 A | 7/1997 | Theimer et al. | |
| 5,712,960 A | 1/1998 | Chiopris et al. | |
| 5,812,994 A | 9/1998 | Imlah | |
| 6,883,034 B1 | 4/2005 | Pelavin et al. | |
| 6,910,003 B1 | 6/2005 | Arnold et al. | |
| 6,925,443 B1 | 8/2005 | Baggett, Jr. et al. | |
| 6,941,471 B2 | 9/2005 | Lin | |
| 6,952,737 B1 | 10/2005 | Coates et al. | |
| 7,120,635 B2 * | 10/2006 | Bhide et al. | 1/1 |
| 7,184,985 B2 | 2/2007 | DeTreville | |
| 7,260,831 B1 | 8/2007 | Beznosov et al. | |
| 7,505,970 B2 | 3/2009 | Adya et al. | |
| 7,734,662 B2 | 6/2010 | Rowley et al. | |
| 8,010,560 B2 * | 8/2011 | Becker et al. | 707/783 |
| 8,209,738 B2 * | 6/2012 | Nicol et al. | 726/1 |
| 8,266,702 B2 * | 9/2012 | Naldurg et al. | 726/25 |
| 8,607,311 B2 | 12/2013 | Becker et al. | |

(Continued)

OTHER PUBLICATIONS

"Abductive Reasoning", Reference.com. Wikipedia, the free encyclopedia, http://www.reference.com/browse/wiki/Abductive_reasoning.

(Continued)

*Primary Examiner* — Tae Kim
(74) *Attorney, Agent, or Firm* — Steve Wight; Judy Yee; Micky Minhas

(57) ABSTRACT

Software tools assist an access-policy analyst or creator to debug and/or author access policies. An access request contains a query that evaluates to either true or false depending on whether access is to be allowed. Abduction may be used to generate assumptions that, if true, would cause the access request to be true. The tool may perform analysis on the generated assumptions, such as: comparing the assumptions with tokens to detect errors in the tokens or to suggest changes to the tokens that would cause the query to be satisfied, or comparing the assumptions to a meta-policy. The tool may allow an analysis, policy author, or other person to interactively walk through assumptions in order to see the implications of the access policy.

20 Claims, 6 Drawing Sheets

(56) References Cited

U.S. PATENT DOCUMENTS

| | | | |
|---|---|---|---|
| 2002/0116647 | A1 | 8/2002 | Mont et al. |
| 2003/0037263 | A1 | 2/2003 | Kamat et al. |
| 2004/0215642 | A1 | 10/2004 | Cameron et al. |
| 2004/0243576 | A1 | 12/2004 | Shrivastava et al. |
| 2005/0021498 | A1 | 1/2005 | Boreham et al. |
| 2005/0043932 | A1 | 2/2005 | Cardelli et al. |
| 2005/0086540 | A1 | 4/2005 | Gunter et al. |
| 2006/0005227 | A1* | 1/2006 | Samuelsson et al. ............ 726/1 |
| 2006/0031762 | A1 | 2/2006 | Takashima |
| 2006/0112048 | A1 | 5/2006 | Talbot et al. |
| 2006/0206925 | A1 | 9/2006 | Dillaway et al. |
| 2006/0253700 | A1 | 11/2006 | Della-Libera et al. |
| 2006/0256953 | A1 | 11/2006 | Pulaski et al. |
| 2007/0094216 | A1 | 4/2007 | Mathias et al. |
| 2007/0203881 | A1* | 8/2007 | Schaad et al. ................. 707/1 |
| 2007/0289024 | A1 | 12/2007 | Mohammed |
| 2008/0104665 | A1* | 5/2008 | Naldurg et al. ................ 726/2 |
| 2008/0301765 | A1* | 12/2008 | Nicol et al. .................. 726/1 |
| 2009/0164469 | A1* | 6/2009 | Becker et al. ................. 707/9 |
| 2009/0165110 | A1 | 6/2009 | Becker et al. |

OTHER PUBLICATIONS

"Charles Sanders Peirce, Deduction, Induction, and Abduction", http://plato.stanford.edu/entries/peirce/#dia.

"OASIS eXtensible Access Control Markup Language (XACML) TC ", www.oasis-open.org/committees/xacml.

Bandara, et al., "Toward a Formal Characterization of Policy Specification & Analysis", pp. 1-9.

Becker Moritz Y., "Cassandra: flexible trust management and its application to electronic health records", Date: Oct. 2005, pp. 1-214.

Becker, et al., "Design and Semantics of a Decentralized Authorization Language", pp. 1-13.

Becker, et al., "SecPAL: Design and Semantics of a Decentralized Authorization Language", Date: Sep. 2006, pp. 1-33.

Becker, et al., "The Role of Abduction in Declarative Authorization Policies", Date: Aug. 2007, pp. 1-21.

Bonatti, et al., "Advanced Policy Explanations on the Web", pp. 1-5.

Canovas, et al., "Delegation in Distributed Systems: Challenges and Open Issues", Proceedings of the 14th International Workshop on Database and Expert Systems Applications (DEXA'03), Date: 2003, pp. 1-5.

Chleq Nicolas, "Constrained Resolution and Abducttve Temporal Reasoning", http://www.blackwell-synergy.com/doi/abs/10.1111/j.1467-8640.1996.tb00268.x?journalCode=coin.

De Treville John, "Binder, a Logic-Based Security Language", Date: 2002, pp. 1-9.

Dillaway Blair, "A Unified Approach to Trust, Delegation, and Authorization in Large-Scale Grids", Date: Sep. 2006, pp. 1-24, Microsoft Corporation, Redmond, WA.

Dillaway, et al., "Security Policy Assertion Language (SecPAL) Specification", Date: Feb. 15, 2007, pp. 1-51.

Humphrey, et al., "Fine-Grained Access Control for GridFTP using SecPAL", Preliminary version; to appear in 8th IEEE/ACM International Conference on Grid Computing (Grid 2007), Date: Sep. 19-21, 2007, pp. 1-9.

Kakas Antonis, "Integrating Abduction and Constraint Solving", Date: 2000, pp. 1-7.

Kakas, et al., "Reasoning Techniques for Analysis and Refinement of Policies for Service Management", Date: 2005, pp. 1-64.

Kakas, et al., "The Role of Abduction in Logic Programming", pp. 1-80.

Koshutanski, et al., "Abduction and Deduction in Logic Programming for Access Control for Autonomic Systems", Date: Jun. 2005, pp. 1-40.

Koshutanski, et al., "E Pluribus Unum", Date: 2005, pp. 179-190.

Koshutanski, et al., "Interactive Access Control for Web Services", pp. 1-16.

Kotenko, et al., "The Event Calculus Implementation Using ILOG JRules for Security Policy Verification", pp. 1-4.

Li, et al., "A Logic-based Knowledge Representation for Authorization with Delegation (1999)", Proceedings of the 12th IEEE Computer Security Foundations Workshop, Date: Jun. 1999, pp. 1-14.

Nikita Borisov, "Active Certificates: A Framework for Delegation", Date: 2002, pp. 1-32.

Ninghui Li, "Delegation Logic: A Logic-based Approach to Distributed Authorization", Date: Sep. 2000, pp. 1-116.

Thagard, et al., "Abductive Reasoning: Logic, Visual Thinking, and Coherence", http://cogsci.uwaterloo.ca/Articles/Pages/%7FAbductive.html.

Turner Christopher, "Constraint Based Reasoning with Constraint Logic Programming and Array Based Logic", Date: Nov. 1996, pp. 1-37.

* cited by examiner

ACCESS POLICY ANALYSIS

CROSS-REFERENCE TO RELATED CASES

This application is related to U.S. patent application Ser. No. 11/962,746, entitled "Abducing Assertion to Support Access Query," filed Dec. 21, 2007 (issued as U.S. Pat. No. 8,010,560), and U.S. patent application Ser. No. 11/962,761, entitled "Delegation in Logic-Based Access Control," filed Dec. 21, 2007, both of which are incorporated herein by reference.

BACKGROUND

An access control system uses a policy to govern access to a resource. A simple access control system may allow the owner of a resource to grant specific principals or groups access to the resource. For example, if a user named Joe is the owner of a file named foo.txt, then Joe may specify that principals named A, B, and C, or principals who are members of group G, have access to foo.txt. Joe may also be able to grant different types of access separately, such as granting read access to some principals or groups, and read/write access to others.

Some modern access control systems, such as those implemented with the Security Policy Assertion Language ("SecPAL"), implement access control policies as a system of logical rules. In such a system, principals may make assertions, and the sufficiency of these assertions to grant access to the resource is judged against the rules. For example, Joe might make the assertion "Joe says Bob can read foo.txt." If there is a rule that says "Authority says Joe can say % X can read foo.txt" (% X is a variable), then, under this rule, Joe's assertion is sufficient to prove that Authority says Bob can read foo.txt, so Bob would be granted access under this rule.

Abduction is a logical process of deriving premises to support a given conclusion. In a logic-based access control system, an access request may generate a query that takes the form of a conclusion. The conclusion can be either true or false, depending on whether access is to be granted. For example, in order for Bob to be granted permission to read foo.txt, the query "Authority says Bob can read foo.txt?" is a statement that is to be true if access is to be granted. Given the rule ("Authority says Joe can say % X can read foo.txt"), one can abduce an assumed fact—i.e., "Joe says Bob can read foo.txt"—which, if actually asserted by Joe, would cause the query to be true under the rule and therefore would result in allowance of access. This assertion, if made, would either be a proof of the conclusion represented by the access query, or would be part of such a proof.

An abduction engine may be used to automate the process of abducing the assertions that support an access request. Such an abduction engine generates a set of assumptions that, if true, would cause the access request to succeed. The raw assumptions may be of limited usefulness in helping a person to debug an existing policy or to author a new policy. The assumptions could be provided to a tool that assists in policy analysis.

SUMMARY

A tool may be provided that helps a person to analyze an access policy. The analysis may be performed, for example, to debug an existing access policy, to author a new policy, etc.

The tool may receive a set of assumptions, such as those generated by an abduction engine. The assumptions may be facts that, if true, would cause an access query to succeed. The tool may compare the assumptions with tokens that represent existing assertions to identify possible errors in the tokens, such as minor spelling or syntax errors that are causing an access request to fail. The tool may allow a person to interactively display abduced proofs of an access query in order to allow the person to see the implications of a particular policy (e.g., to evaluate whether the policy allows or denies access in unexpected cases). The tool may also allow a person to specify a "meta-policy" that defines some kinds of facts that the policy author wants (or does not want) to cause an access request to succeed. The tool may use and/or work with an abduction engine, and may act as an interface through which a policy author, administrator, etc., uses assumptions generated by the abduction engine to analyze the policy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A logic-based access control system may implement access control policies based on a system of formal logic. SecPAL is one example of such a system, although a logic-based access control system could be implemented using any logic system, such as constrained Datalog. In an access control system, policies take the form of logic rules, and are normally expressed as assertions that an authority over a resource makes with respect to principals and/or resources—e.g., "Authority says Joe can say % X can read foo.txt" (where % X is a variable name). Gaining access to a resource involves making an access request, where a resource guard formulates a query based on the access request. If "Authority" is the name of the authority over a resource named foo.txt, then demonstrating a principal, P's, right to access the resource amounts to demonstrating (logically proving) that the statement "Authority says P can read foo.txt" is true. Thus, a logic-based access control system, as part of evaluating an access request, attempts to determine if this statement is derivable (provable) from the existing facts.

Logic-based access control systems allow for the implementation of rich and complex policies, which facilitates the creation of policies that cover complex access scenarios (e.g., those scenarios in which access decisions are made across distributed systems, in which the ultimate authority over a resource may not have knowledge of the principals who will actually access the resource). However, the price of this richness is that it may be difficult to understand the logical implications of a complex access policy. A sufficiently complex policy may lead to an access failure (or success) in a situation where such failure (or success) is unexpected or unwanted.

Abduction may be used to generate assumptions that, if true, would cause an access query to succeed. Abduction is a logical process that attempts to reason backward from a conclusion to determine what facts would support the conclusion. An abduction engine may, for example, take a query, a set of given assumptions, and a set of rules, and may attempt to abduce "missing facts" from these rules—i.e., facts that, if present, would cause the query to be satisfied. An abduction engine may be able to generate assumptions that would cause an access query to be true, but these assumptions could be used as part of analysis tools that assist in debugging, policy authoring, etc. Examples of such tools, and examples of analysis scenarios, are described herein.

Figure 1:
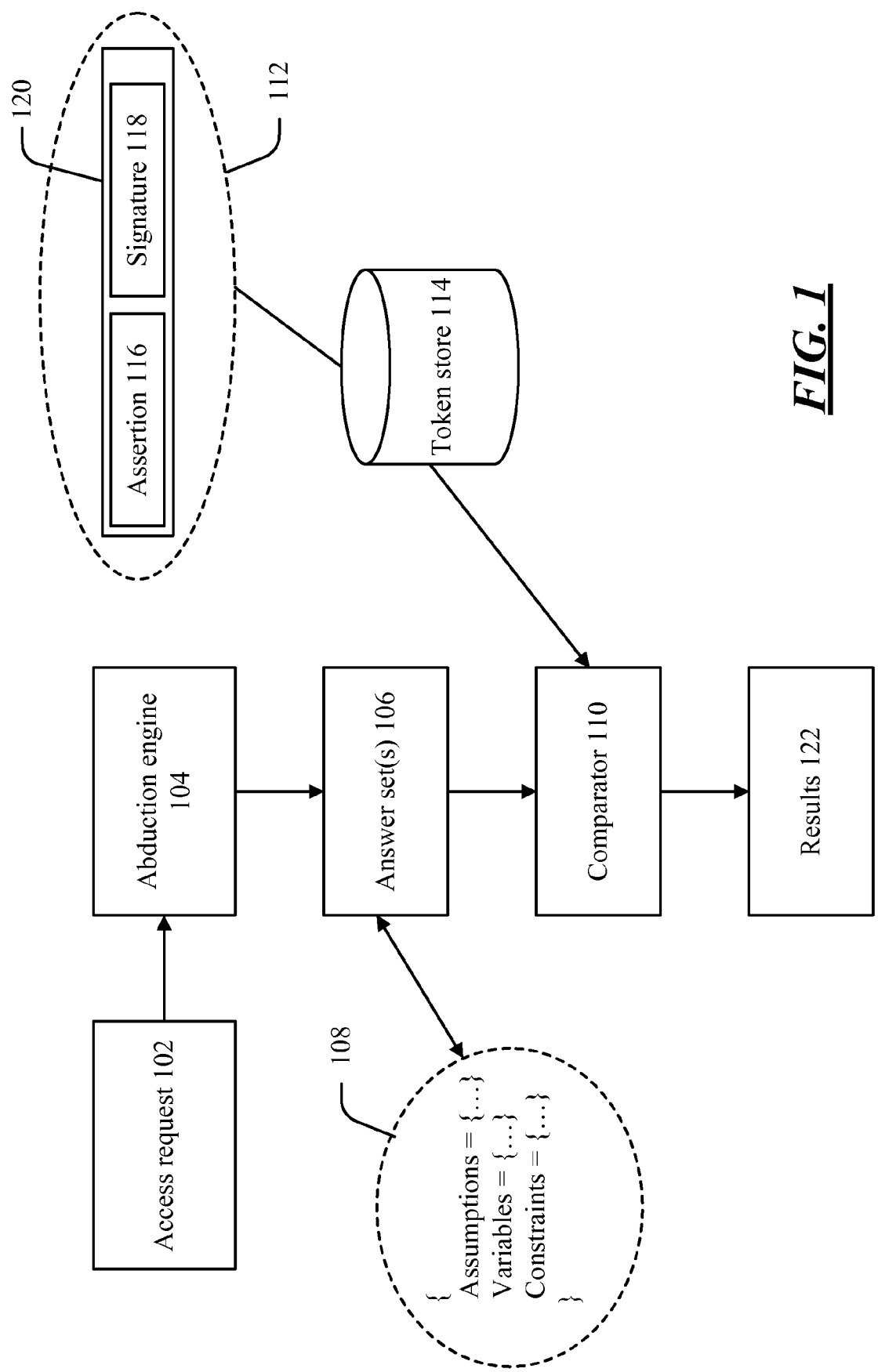
FIG. 1 is a block diagram of an example scenario in which abduced assumptions are compared with existing tokens to identify potential errors in tokens or to suggest potential changes.

Turning now to the drawings, FIG. 1 shows an example scenario in which abduced assumptions are compared with existing tokens to identify potential errors in tokens, or to suggest potential changes that could be made to tokens in order to satisfy an access request. The scenario of FIG. 1 may be used, for example, to debug an access request, or to analyze the effects of a policy under existing tokens.

Access request 102 is a request for one or more principals to access one or more resources. For example, a principal named Bob may be requesting access to a resource named foo.txt. In other examples, a set of principals (e.g., principals who are members of a group named "group1", or a set of named principals such as A, B, and C), could be requesting access, and/or the access request could cover several resources (e.g., all of the files in a particular file system). In discussing the example of FIG. 1 it will be assumed that access to a single resource for a single principal is being requested, and it will be understood how this example could be extended to plural principals and/or plural resources. Access request 102 may be presented to a resource guard that mediates access to the resource. The guard may formulate an access query, such as "Authority says Bob can read foo.txt?" Access is granted if this query evaluates to true, and is denied if the query evaluates to false.

Access request 102 (or a query associated with the access request) is provided to abduction engine 104. Abduction engine 104 generates assumptions that, if presented in the form of actual assertions, would cause the query to be satisfied. To the extent that the query associated with access request is a statement that is to be proved true if access is to be granted, the assumptions (together with any assertions that are known to exist, or can be arranged to exist) would constitute a "proof" of the query statement. Abduction engine 104 uses abductive reasoning to generate the assumptions that, together with the existing or obtainable assertions (if any) would prove the query to be true under the policy rules enforced by the guard.

Abduction engine 104 may generate the assumptions in the form of one or more answer set(s) 106. Answer set(s) 106 specify the assumptions that, together with any existing (or obtainable) assertions, would constitute a proof of the query. If the assumptions include variables, then answer set(s) 106 also specify constraints (if any) on those variables. Item 108 shows an example form of an answer set, which contains one or more assumptions, a list of one or more variables contained in the assumption(s), and a list of one or more constraints on the variables. For example, suppose that the access request is for the principal named "Bob" to read foo.txt. If the relevant policy rule is "Authority says Joe can say %X can read foo.txt where %X matches 'B.*'" (where "B.*" matches any string that begins with "B"), then an example assumption might be "Joe says %X can read foo.txt." In this case, %X is part of the variable list in the answer set, and a constraint on the variable %X (in order for this assumption to both satisfy the policy rule and cause Bob to be granted access) is that %X match the string "Bob".

Answer set(s) 106 are provided to comparator 110. Comparator 110 compares the assumptions (and any applicable constraints) in answer set(s) 106 with one or more existing tokens 112, which may be stored in token store 114. Tokens 112 are stored assertions that have been made. For example, if Joe makes an assertion, then this assertion may be stored in a token, and the token may be signed with Joe's key to demonstrate that the assertion has, in fact, been made by Joe. For example, if Joe has said that Bob can read foo.txt, then the assertion "Joe says Bob can read foo.txt" (or some data representing this assertion) may be stored in a token, and the token may contain Joe's digital signature. In FIG. 1, token 120 (which is one of tokens 112) is shown, by way of example, as containing assertion 116 and signature 118. A token may contain a single assertion or may contain plural assertions. Moreover, a token may be signed by a single principal or by plural principals.

As noted above, comparator 110 compares assumptions in answer set(s) 106 with one or more tokens 112 stored in token store 114. For example, comparator 110 may attempt to determine if there are tokens that satisfy assumptions in answer set(s) 106, or may attempt to determine if there are tokens that do not satisfy those assumptions but that are similar. Continuing with the example above, suppose one of answer set(s) 106 contains the assumption "Joe says %X can read foo.txt" and the constraint "%X matches 'Bob'". Suppose further that token store 114 does not contain a token satisfying this assumption and constraint (e.g., token store 114 does not contain the token "Joes says Bob can read foo.txt"), but that token store 114 does contain the token "Joe says Rob can read foo.txt". Comparator 110 could note that this token does not satisfy the assumption in the answer set but has various similarities. For example, this token is similar to the assumption in the sense that the token is an assertion by Joe, purports to grant read permission in the resource foo.txt, but differs in the identity of the target principal. Additionally, this token is similar to the assumption in the sense that the target principal differs from "Bob" by a one letter. These are examples of similarities that comparator 110 might detect between a token and an assumption. However, comparator 110 may identify any type of similarity, and is not limited to these examples.

Based on the comparison between assumptions and tokens, comparator 110 may provide results 122. Results 122 may take various forms. For example, results 122 identify tokens that are similar to those that would satisfy the assumption in answer set(s) 106, and may indicate the possibility that these tokens have errors. As another example, results 122 may include a suggestion of possible changes to the existing tokens, which would address problems in the tokens. The results could be presented to a person (e.g., an administrator who is authoring or debugging a policy). For example, the results could be presented to the administrator through a software tool that facilitates authoring and/or debugging of policies. This tool may be interactive, and may allow such administrators or other persons to examine policies and their implications. The tool could also allow the person to see the tokens and how they compare to assumptions that are generated by abduction engine 104, in order to facilitate debugging and/or authoring of policies and/or tokens.

Figure 2:
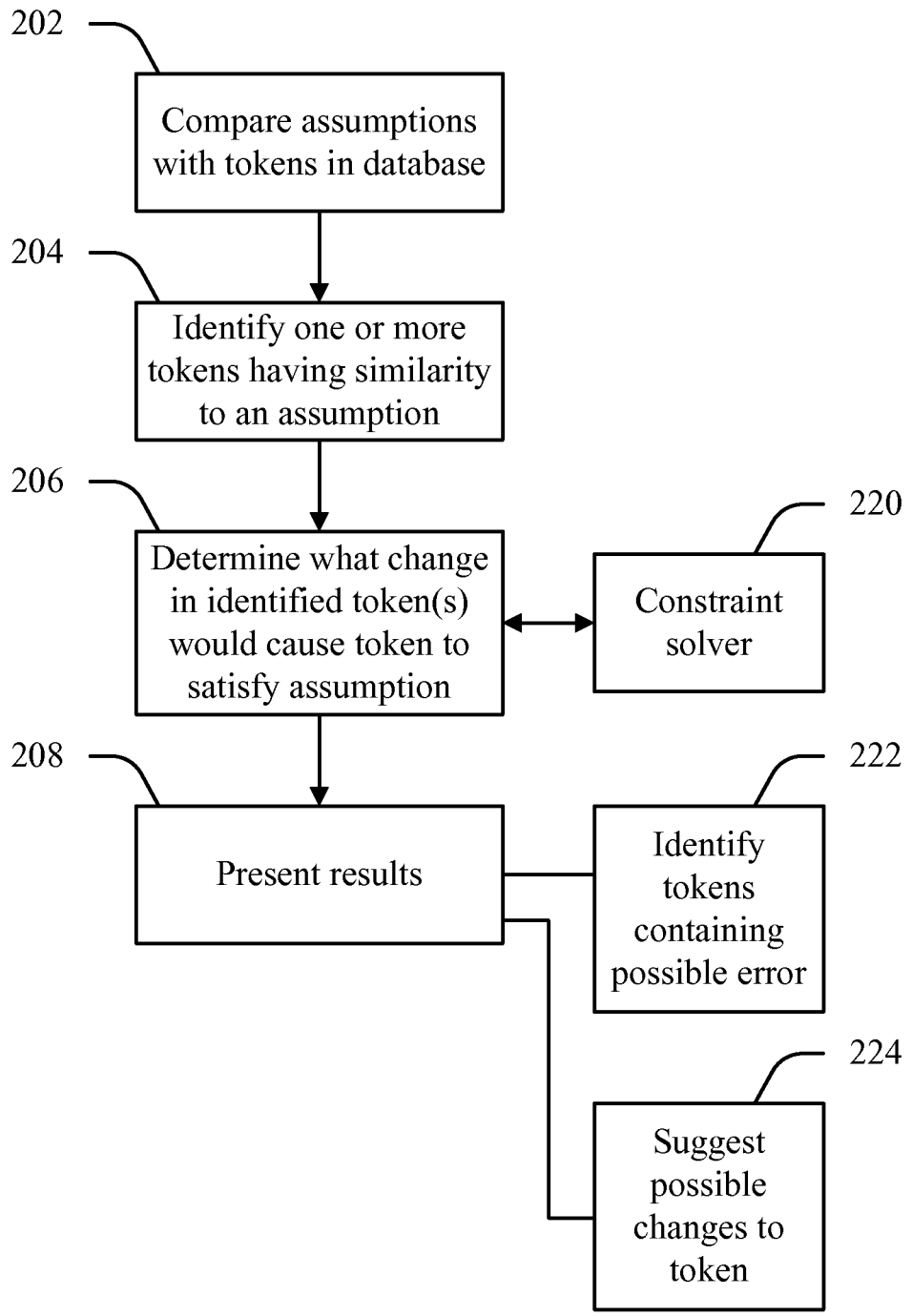
FIG. 2 is a flow diagram of an example process of comparing abduced proofs with tokens.

FIG. 2 shows an example process of comparing abduced proofs with tokens. This process may be performed, for example, with respect to the scenario shown in FIG. 1, but could also be performed with respect to any system or process. Moreover, the flow diagram in FIG. 2 (as well as the flow diagrams in FIGS. 4 and 5) show examples in which stages of a process are carried out in a particular order, as indicated by the lines connecting the blocks, but the various stages shown in these diagrams can be performed in any order, or in any combination or sub-combination.

At 202, the assumption(s) in an answer set are compared with existing tokens. The existing tokens may, for example, be retrieved from a token database. At 204, one or more tokens that have some form of similarity to an assumption are identified. For example, a token could be identified that uses the same verbs as an assumption, or that has a constant (e.g., principal name, group name, etc.) in common with an assumption, or that has a constant that differs some small amount from the value called for by an assumption or a variable constraint.

At 206, a determination may be made as to what changes in the identified token(s) would cause these tokens to satisfy assumptions and/or their associated constraints. This determination may be made, for example, in conjunction with a constraint solver 220. For example, if an assumption/constraint to be satisfied is "Joe says % X can read foo.txt, where % X matches 'B.*'", then constraint solver 220 could generate some values for % X that begin with "B" in order to suggest values that would satisfy the assumption/constraint. These suggested values can be compared with the identified tokens in order to find tokens that contain possible errors and/or to find possible changes that could be made to the existing tokens to cause them to satisfy the assumptions/constraints in an answer set.

At 208, results are presented based on what is determined at 206. These results may take various forms. For example, as discussed above in connection with FIG. 1, a token containing a possible error may be identified (at 222), and/or suggestions may be made as to how existing tokens could be changed to cause these tokens to satisfy assumptions and/or constraints (at 224). The results presented at 226 could take any form, and the foregoing are merely examples of such results.

Figure 3:
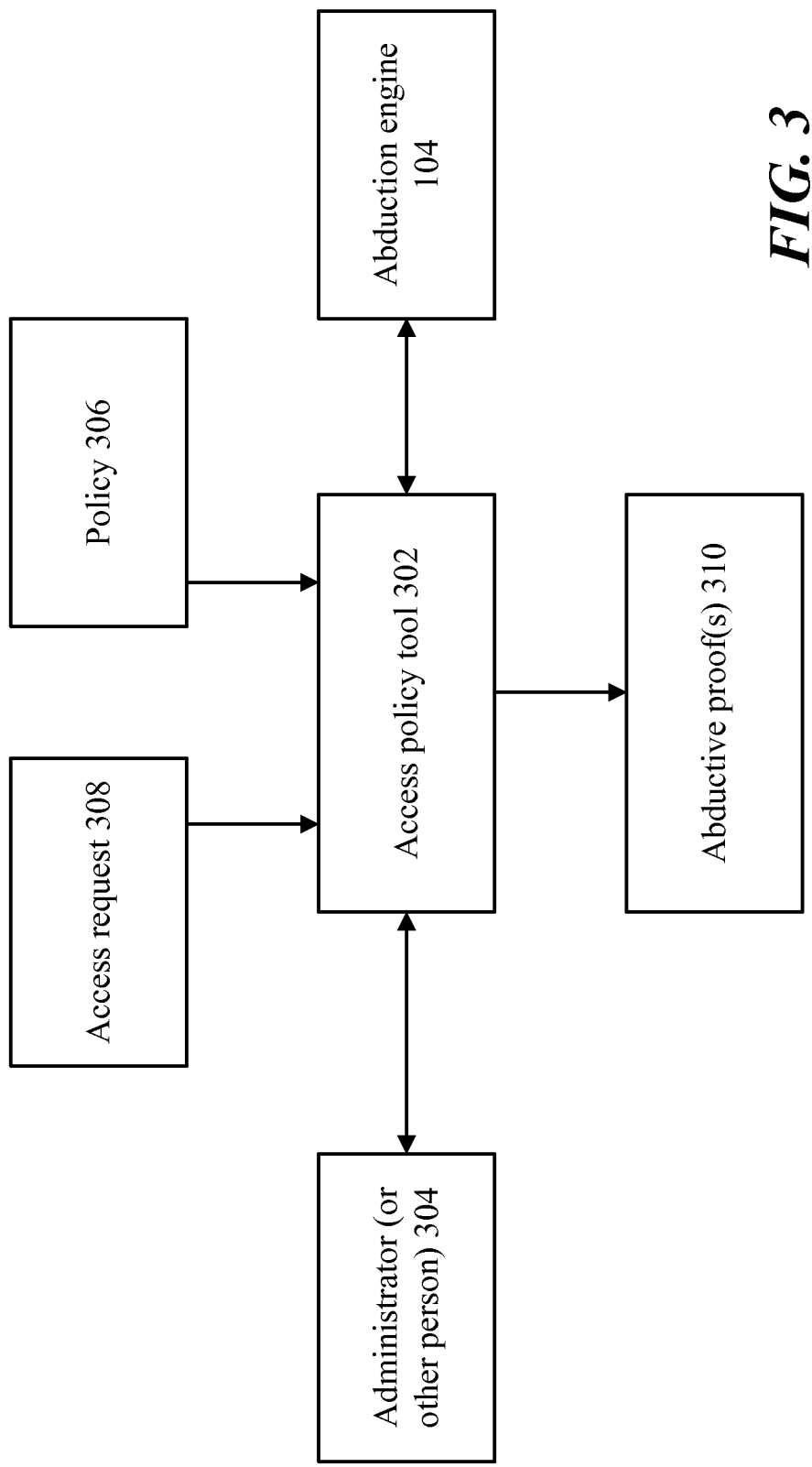
FIG. 3 is a block diagram of a scenario in which an access policy tool is used by an administrator or other person to analyze a policy.

As previously noted, the subject matter described herein may be used as part of an access policy tool that assists with debugging and/or authoring of access policies. FIG. 3 shows a scenario in which an access policy tool is used by an administrator or other person to analyze a policy.

Access policy tool 302 may, for example, comprise software that runs on a computer, and may assist an administrator 304 (or other person) in analyzing a policy. For example, administrator 304 may use access policy tool to analyze policy 306 and its implications, and/or to debug access request 308 under policy 306. Thus, access request 308 and/or policy 306 may be provided to access policy tool 302, which may use abduction engine 104 to generate one or more answer set(s). These answer sets may be used as part of an analysis of access request 308 and/or policy 306—e.g., to debug an access failure, or to find the various implications of a policy 306. For example, access policy tool 302 may provide administrator 304 (or another person) with a display screen that shows potential errors in tokens, possible abductive proofs of a particular access query etc.

In one example, access policy tool provides functionality to debug an access request or to author a policy. For example, administrator 304 (or another person) may provide access policy tool with a specific access request that has failed (or, perhaps, one that has not failed but for which the person would like to determine if it will succeed and/or how it can be made to succeed). Thus, access policy tool 302 is provided with an access request 308, a policy 306, and has access to a database of tokens (e.g., token store 114, shown in FIG. 1). In this example, access policy tool 302 uses abduction engine 104 to generate answer sets for a query contained in the access request. The assumptions and/or constraints in these answer sets may then be compared with existing tokens in order to determine if tokens exist that would satisfy the access request, and/or to identify potential errors in the tokens, and/or to suggest changes to the tokens that would cause the access request to be satisfied. This information may be provided to administrator 304 (or another person)—e.g., by showing the information on a display as part of an interactive authoring and/or debugging program.

As another example, access policy tool 302 may be used to identify the various implications of a policy, and a way for administrator 304 (or another person) to verify that a policy that is being authored will produced its intended results. For example, administrator 304 could provide a policy 306 to access policy tool 302, and then ask access policy tool 302 to provide abductive proof(s) 310 of that policy (which, for example, access policy tool 302 may obtain using abduction engine 104). As one example, access policy tool 302 may allow administrator 304 (or another person) to interactively walk through proofs, as a way of verifying that a policy that is being authored will allow access under the circumstances intended, and/or as a way of verifying that the policy will disallow access under circumstances where access is not intended.

Figure 4:
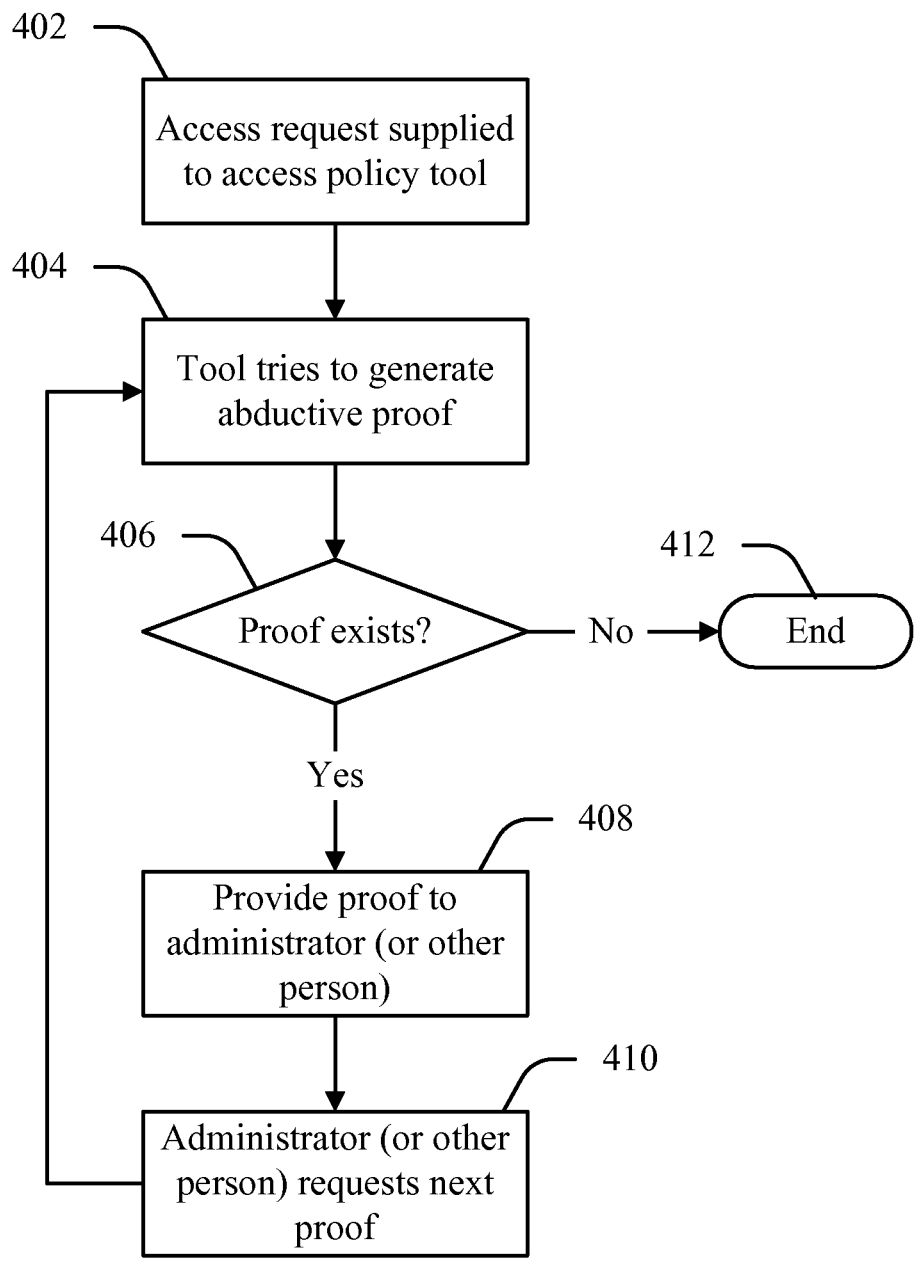
FIG. 4 is a flow diagram of an example process in which an administrator or other person may walk through a set of abduced proofs.

This latter example is shown in the form of a flow diagram in FIG. 4. At 402, an access request is submitted to an access policy tool. At 404, the tool attempts to generate an abductive proof—e.g., using an abduction engine that either is incorporated in the tool or with which the tool communicates. If no such proof exists, then the process terminates (at 412). If such a proof exists (as determined at 406), then the proof is provided to an administrator (or other person) (at 408). If the administrator (other person) requests another proof (at 410), then the process returns to 404 to attempt to generate such other proof.

Figure 5:
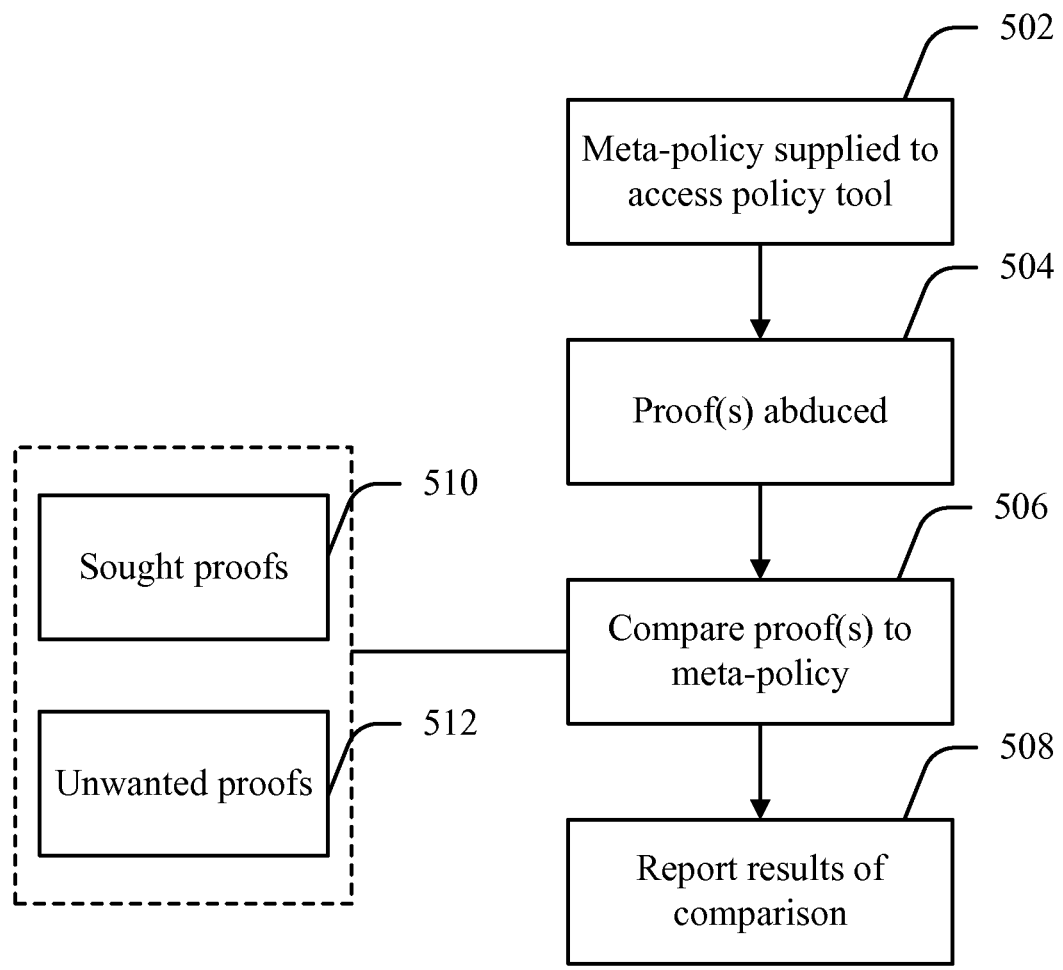
FIG. 5 is a flow diagram of an example process in which meta-policies are used to analyze policies.

FIG. 5 shows a further example of a process that relates to analyzing access policies. This process could be implemented by the access policy tool discussed above, but could also be implemented as part of any other component, or in any other context. In the process shown in FIG. 5, a "meta-policy" specifies what kinds of proofs are to exist (or not to exist) under a particular policy, in order to determine that the underlying policy satisfies certain conditions.

At 502, a meta-policy is supplied to an access tool. The meta-policy specifies what types of proofs are to exist and/or not to exist under some policy that is being authored. At 504, the policy and an access request are provided to an abduction engine, and proofs of the access request are abduced. At 506, the abduced proofs are compared with the meta-policy. This comparison may involve determining whether the abduced proofs include proofs that are sought (510) (e.g., in the case where the meta-policy specifies proofs that are to exist in order for the policy that is being authored to meet some goal). As another example, the comparison may involve determining that the policy does not allow some unwanted proofs (512) to be abduced from the access request.

For example, suppose that an administrator wants to author a policy, but wants to ensure that the policy will not allow any principal who is not a member of the group named "group1" to access the resource foo.txt. Then a meta-policy specifying that no proofs are to exist that satisfy "% P can read foo.txt AND Not (% P possesses % A where % A matches "group1"). An access policy tool could then provide the access query "% P can read foo.txt", as well as the policy being authored, to an abduction engine and ask the abduction engine to generate abductive proofs for the query. The access policy tool can then compare the proofs generated with the meta-policy to determine whether any of the proofs violate the meta-policy. The meta-policy could specify conditions that are to be un-satisfiable (e.g., as in the above example, where the meta-policy specifies that the condition of a principal that does not possess "group1" being allowed to read foo.txt is to be unsatisfiable under the policy). Or, the meta-policy could specify conditions that are to be satisfiable. The use of meta-policies in this manner could be used to assist an administrator in writing policies that meet the administrator's intended goals. As another example, such meta-policies could be used as part of policy administration that takes place through various levels of management—e.g., an administrator at a remote office of an organization could be allowed to author a policy, and then the central information technology administration of the organization could use the meta-policy to verify that policies being written by subordinates are compliant with the organization's goals.

Figure 6:
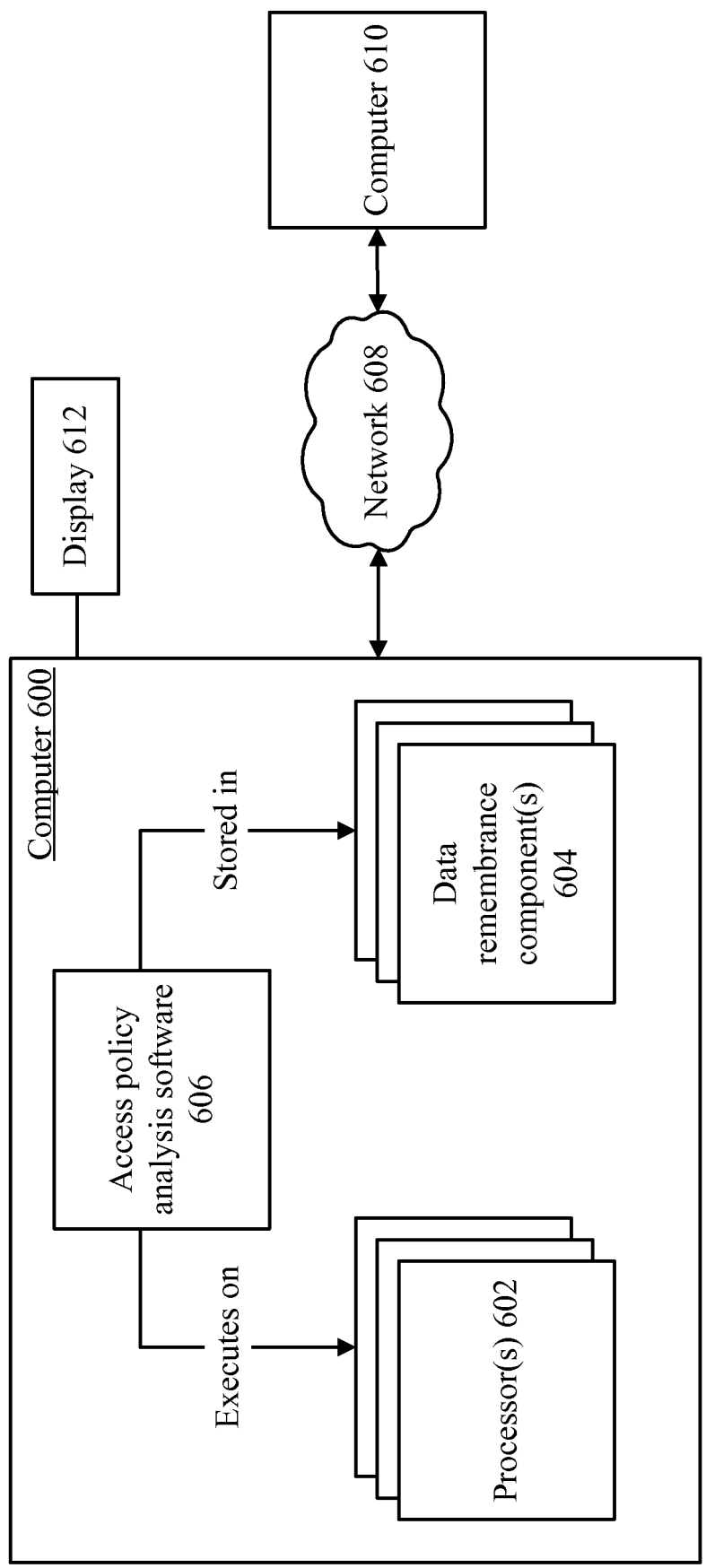
FIG. 6 is a block diagram of example components that may be used in connection with implementations of the subject matter described herein.

FIG. 6 shows an example environment in which aspects of the subject matter described herein may be deployed.

Computer 600 includes one or more processors 602 and one or more data remembrance components 604. Processor(s) 602 are typically microprocessors, such as those found in a personal desktop or laptop computer, a server, a handheld computer, or another kind of computing device. Data remembrance component(s) 604 are components that are capable of storing data for either the short or long term. Examples of data remembrance component(s) 604 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 600 may comprise, or be associated with, display 612, which may be a cathode ray tube (CRT) monitor, a liquid crystal display (LCD) monitor, or any other type of monitor.

Software may be stored in the data remembrance component(s) 604, and may execute on the one or more processor(s) 602. An example of such software is access policy analysis software 606, which may implement some or all of the functionality described above in connection with FIGS. 1-5, although any type of software could be used. Software 606 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 6, although the subject matter described herein is not limited to this example.

The subject matter described herein can be implemented as software that is stored in one or more of the data remembrance component(s) 604 and that executes on one or more of the processor(s) 602. As another example, the subject matter can be implemented as software having instructions to perform one or more acts, where the instructions are stored on one or more computer-readable storage media.

In one example environment, computer 600 may be communicatively connected to one or more other devices through network 608. Computer 610, which may be similar in structure to computer 600, is an example of a device that can be connected to computer 600, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage memories comprising executable instructions to perform a method of analyzing an access policy, the method comprising:
   abducing a set that comprises an assumption from information that comprises: (a) an access query that evaluates to true or false depending on whether access to a resource is granted, and (b) one or more rules that govern access to said resource;
   comparing said set with a plurality of tokens stored in a token store;
   identifying a first one of said plurality of tokens based on a first finding that said first one of said plurality of tokens does not satisfy said set but has a similarity to said set;
   comparing said set with a meta-policy, said meta-policy being separate from said access policy, said meta-policy specifying that said access policy is not allowed to permit access to any principal who is not a member of a first group, said meta-policy also specifying a set of proofs that are sought to meet a goal, said meta-policy also specifying a set of unwanted proofs that are not allowed under said access policy, said meta-policy further specifying a set of conditions that are to be un-satisfiable under said access policy;
   determining whether said set contains any assumptions that correspond to tokens that, when presented to a guard of said resource, would allow a principal who is not a member of said first group to access said resource; and
   providing, to a person, a result that is based on said first one of said plurality of tokens.

2. The one or more computer-readable storage memories of claim 1, wherein said providing further comprises:
   communicating, to said person, a second finding that said first one of said plurality of tokens contains an error.

3. The one or more computer-readable storage memories of claim 1, wherein said providing further comprises:
   communicating, to said person, a suggested change to said first one of said plurality of tokens that would cause said token to satisfy said set.

4. The one or more computer-readable storage memories of claim 1, wherein said identifying finds said similarity by determining that said token and said set have a verb in common, or that constants appearing in said token and said set differ from each other by less than a specified amount.

5. The one or more computer-readable storage memories of claim 1, wherein said set further comprises a variable that appears in said assumption and a constraint on said variable, and wherein the method further comprises:
   generating a value for said variable that satisfies said constraint.

6. The one or more computer-readable storage memories of claim 1, wherein the method further comprises:
   receiving an assertion from said person;
   providing said assertion, said access query, and said one or more rules to an abduction component that performs said abducing, wherein the assumption in said set, in combination with said assertion, would cause said access query to evaluate to true.

7. The one or more computer-readable storage memories of claim 1, wherein said access query has failed, and wherein the method further comprises:
receiving, from said person, a request to debug said access query.

8. A method of facilitating analysis of an access policy, the method comprising:
using a processor to perform acts comprising:
receiving a meta-policy that describes a first condition that is to be satisfied by the access policy that governs access to a resource, said meta-policy being separate from said access policy, said meta-policy specifying that said access policy is not allowed to permit access to any principal who is not a member of a first group, said meta-policy also specifying a set of proofs that are sought to meet a goal, said meta-policy also specifying a set of unwanted proofs that are not allowed under said access policy, said meta-policy further specifying a set of conditions that are to be un-satisfiable under said access policy;
abducing one or more proofs of a query that evaluates to true or false depending on whether access to said resource is to be granted or denied, said abducing being based on information comprising: (a) said query, (b) the access policy;
comparing said one or more proofs to said meta-policy to determine whether any of said one or more proofs allow a principal who is not a member of said first group to access said resource; and
providing a result indicating whether said access policy satisfies said meta-policy.

9. The method of claim 8, wherein the meta-policy defines a second condition that is not to exist in any proof that satisfies said query, said acts further comprising:
determining, based on said comparing, whether any of said one or more proofs meets said condition.

10. The method of claim 8, wherein the meta-policy defines an aspect of a proof that causes said query to evaluate to true, said acts further comprising:
determining, based on said comparing, whether a proof that meets said aspect is among said one or more proofs.

11. The method of claim 8, wherein the meta-policy defines a condition that is to exist in a proof that satisfies said query, said acts further comprising:
determining, based on said comparing, whether any of said one or more proofs meets said condition.

12. The method of claim 8, said acts further comprising:
determining that said query has been presented to a guard of said resource and has failed to produce access; and
after said query has failed to produce access, receiving, from a person, a request to debug said query.

13. The method of claim 8, said acts further comprising:
displaying, to a person, proofs to said query in response to requests from said person.

14. A system comprising:
one or more data remembrance components;
one or more processors; and
one or more executable components that are stored in at least one of said one or more data remembrance components and that execute on at least one of said one or more processors, wherein the executable components receive a query and a policy, either abduce one or more proofs of said query under which said query is true under said policy or that obtain said one or more proofs from an abduction engine, perform a comparison of said one or more proofs with a meta-policy and with one or more tokens in a token store, and provide a result based on said comparison, said meta-policy being separate from said policy, said meta-policy specifying that said policy is not allowed to permit access to any principal who is not a member of a first group, said meta-policy also specifying a set of proofs that are sought to meet a goal, said meta-policy also specifying a set of unwanted proofs that are not allowed under said policy, said meta-policy further specifying a set of conditions that are to be un-satisfiable under said access policy, the comparison between said one or more proofs and said meta-policy determining whether any of said one or more proofs allow any principal who is not a member of said first group to access said resource.

15. The system of claim 14, wherein said executable components compare said one or more proofs with said one or more tokens, determine based on said comparison, that at least one of said one or more tokens contains an error, and wherein said result comprises an indication of said error.

16. The system of claim 14, wherein said executable components identify a change that, if made to said one or more tokens, would cause said token to satisfy at least a part of one of said one or more proofs, and wherein said result comprises and indication of said token and said change.

17. The system of claim 14, wherein a first one of said one or more proofs comprises (a) an assumption involving a variable, and (b) a constraint on said variable, and wherein said one or more components further comprise:
a constraint solver that generates a value for said variable that satisfies said constraint.

18. The system of claim 14, further comprising:
said abduction engine, which derives an assumption from said query and said policy, wherein said assumption, if asserted, would cause said query to evaluate to true under said policy.

19. The system of claim 14, wherein said meta-policy defines a condition that is to apply to each proof of said query, wherein said executable components determine, based on said comparison, whether each of said one or more proofs complies with said condition, and wherein said result comprises an indication of whether there is a proof that does not comply with said condition.

20. The system of claim 14, wherein said meta-policy defines a condition that is not to exist in any proof of said query, wherein said executable components determine, based on said comparison, whether any of said one or more proofs has said condition, and wherein said result comprises an indication of whether there is a proof that meets said condition.

* * * * *